United States Patent
Myles et al.

(10) Patent No.: US 7,151,945 B2
(45) Date of Patent: Dec. 19, 2006

(54) METHOD AND APPARATUS FOR CLOCK SYNCHRONIZATION IN A WIRELESS NETWORK

(75) Inventors: Andrew F. Myles, St. Ives (AU); David S. Goodall, Randwick (AU); Alex C. K. Lam, Chatswood (AU)

(73) Assignee: Cisco Systems Wireless Networking (Australia) Pty Limited, North Sydney (AU)

( * ) Notice: Subject to any disclaimer, the term of this patent is extended or adjusted under 35 U.S.C. 154(b) by 1084 days.

(21) Appl. No.: 10/112,220

(22) Filed: Mar. 29, 2002

(65) Prior Publication Data

US 2004/0008661 A1    Jan. 15, 2004

(51) Int. Cl.
*H04B 7/01* (2006.01)
*H04B 1/16* (2006.01)

(52) U.S. Cl. .............. 455/502; 455/208; 455/265

(58) Field of Classification Search ............ 455/502, 455/208, 265, 39, 151.3, 196.1; 375/149, 375/293, 354, 355, 356; 370/324, 350
See application file for complete search history.

(56) References Cited

U.S. PATENT DOCUMENTS

| | | | | |
|---|---|---|---|---|
| 4,151,485 A * | 4/1979 | LaFratta | ............ | 331/1 A |
| 5,408,506 A * | 4/1995 | Mincher et al. | ............ | 375/134 |
| 6,028,903 A * | 2/2000 | Drost et al. | ............ | 375/360 |
| 6,262,999 B1 * | 7/2001 | Fournier | ............ | 370/516 |
| 6,661,811 B1 * | 12/2003 | Baker | ............ | 370/516 |
| 6,983,032 B1 * | 1/2006 | Mujica et al. | ............ | 375/375 |
| 7,043,651 B1 * | 5/2006 | Aweya et al. | ............ | 713/400 |
| 2006/0056560 A1 * | 3/2006 | Aweya et al. | ............ | 375/356 |
| 2006/0056563 A1 * | 3/2006 | Aweya et al. | ............ | 375/376 |

FOREIGN PATENT DOCUMENTS

WO    WO 02/073851 A1    9/2002
WO    WO 02/089411 A2    11/2002

OTHER PUBLICATIONS

Mills, D.L., et al., "The Network Time Synchronization Project," available at http://www.ntp.org, a web site dedicated to the network time protocol (NTP), also at http://www.eecis.udel.edu/~mills/ntp.htm.

(Continued)

*Primary Examiner*—Sonny Trinh
(74) *Attorney, Agent, or Firm*—Dov Rosenfeld Inventek

(57) ABSTRACT

A method and apparatus for synchronizing a local clock value in a wireless receiver receiving a data unit containing synchronization information. The method includes receiving a first data unit containing synchronization information, extracting the synchronization information from the received first data unit, copying a local free-running clock at a known reference point in time relative to the time the first data unit was received to generate a local timestamp; and calculating an offset to the free-running clock using the extracted synchronization information and the local timestamp, the calculating in non real-time, such that the sum of the calculated offset and the value of the free-running clock provides a local clock value that is approximately synchronized in time. The apparatus implementing the method is part of a node of a wireless station, and provides a time synchronization function, typically at the MAC layer.

51 Claims, 8 Drawing Sheets

OTHER PUBLICATIONS

Mills, D.L. Improved algorithms for synchronizing computer network clocks. IEEE/ACM Trans. Networks 3, 3 (Jun. 1995), 245-254.

Mills, D.L. Internet time synchronization: the Network Time Protocol. IEEE Trans. Communications COM-39, 10 (Oct. 1991).

James, D.V. "Clock sync protocols as submitted to the p1394.1 committee," IEEE P1394.1, High Performance Serial Bus Bridges Working Group, Oct. 12, 1999. Retrieved from the Internet via http://grouper.ieee.org/groups/1394/1/Documents/br065r00.pdf on Jul. 11, 2003.

Diepstraten, W., Belanger, P. "802.11 MAC Entity: MAC Basic Access Mechanism Privacy and Access Control," IEEE 802.11 TUTORIALS, 1996. Retrieved from the Internet via http://grouper.ieee.org/groups/802/11/Tutorial/MAC.pdf on Jul. 11, 2003.

Haartsen, J.C. "The Bluetooth Radio System," IEEE Personal Communications, IEEE Communications Society, vol. 7, No. 1, Feb. 2000, pp. 28-36. Retrieved from the Internet via http://utep.el.utwente.nl/~haartsen/pcs_bluetooth.pdf on Sep. 23, 2003.

"Broadband Radio Access Networks; (BRAN); HIPERLAN Type 2; System Overview," ETSI Technical Report, TR 101 683 V1.1.1, Feb. 8, 2000. Retrieved from the Internet via http://easy.intranet.gr/H2_overview.pdf on Sep. 23, 2003.

* cited by examiner

METHOD AND APPARATUS FOR CLOCK SYNCHRONIZATION IN A WIRELESS NETWORK

BACKGROUND

The invention is related to wireless communication, and in particular to synchronizing clocks in a wireless data network.

Wireless data networks such as wireless local area networks (WLANs) can be used either to replace wired LANs, or as an extension of the wired LAN infrastructure. IEEE 802.11 is a standard for wireless LANs, and this invention shall be explained with reference to this standard. The invention, however, is not restricted to the IEEE 802.11 standard, and other types of wireless networks such as the HIPERLAN/2 may make use of the methods and apparatuses described herein.

The basic topology of an 802.11 network is shown in FIG. 1A. A Basic Service Set (BSS) consists of two or more wireless nodes, or stations (STAs), which have recognized each other and have established communications. In the most basic form, stations communicate directly with each other on a peer-to-peer level, sharing a given cell coverage area. This type of network is often formed on a temporary basis, and is commonly referred to as an ad hoc network, or Independent Basic Service Set (IBSS).

In most instances, the BSS contains an Access Point (AP). The main function of an AP is to form a bridge between wireless and wired LANs. The AP is analogous to a base station used in cellular phone networks. An AP can also work as a repeater. When an AP is present, stations do not communicate on a peer-to-peer basis. All communications between stations or between a station and a wired network client go through the AP. AP's are typically not mobile, and typically form part of the wired network infrastructure. A BSS in this configuration is said to be operating in the infrastructure mode. Two BSSs, BSS-1 and BSS-2 in infrastructure mode are shown in FIG. 1B, both connected to a wired network.

It is advantageous to keep stations in a wireless network synchronized, and indeed the IEEE 802.11 standard, e.g., the IEEE 802.11 MAC standard specifies that stations be so synchronized. Such synchronization is needed for example in networks that use frequency hopping in the physical layer (PHY) in order to keep the hopping synchronized. Synchronization also plays an important part in power saving. The IEEE 802.11 standard defines two power saving modes, active and power save. Within the power save mode there are two states, doze and awake. When in the doze state, stations must "wake up" periodically to listen for periodic beacons that indicate whether the AP has queued messages. The STAs need to be synchronized to wake up at the correct time. Such power saving functions are sure to become more important as low power hand-held wireless devices are introduced.

The IEEE 802.11 standard specifies that STAs maintain a local station clock, and that all station clocks within a BSS are synchronized by periodic transmission of timestamped beacons. The MAC function of keeping the timers of all STAs in the same BSS synchronized is called the Timing Synchronization Function (TSF). In the infrastructure mode, the AP serves as the timing master and generates all timing beacons. Synchronization is maintained to within 4 microseconds plus propagation delay.

The IEEE 802.11 standard also defines probe request and probe response management frames. A station issues a probe request and another station or AP responds with a probe response that includes a timestamp. This timestamp also can be used for synchronization.

In the prior art, TSF is typically performed by real-time processing in software, using comparison and modification of the running hardware TSF clock. Such an approach can cause problems. Firstly, the hardware clock may arbitrarily jump in time. Secondly, the requirement for real time processing in software is onerous.

Most current MAC implementations place little reliance on accurate time, for example because they are not aggressive in power save, and other such advanced functionality requiring accurate synchronization. Future MAC implementations may place more importance on accurate clocks. The MAC implementations for correcting the hardware clock may be excessively complex if the hardware clock is permitted to arbitrarily jump in time or requires real time processing in software.

Thus there is a need for a method and apparatus for providing a hardware clock that always counts up, and does not require real time processing in software in order to maintain a synchronized TSF clock.

SUMMARY

One embodiment of the invention provides a clock that typically offers advantages over clock values obtained using software with real-time processing methods. Described herein is a method and apparatus for synchronizing a local clock value in a wireless receiver receiving a data unit containing synchronization information. The method includes receiving a first data unit containing synchronization information, extracting the synchronization information from the received first data unit, copying a local free-running clock at a known reference point in time relative to the time the first data unit was received to generate a local timestamp; and calculating an offset to the free-running clock using the extracted synchronization information and the local timestamp, the calculating in non real-time, such that the sum of the calculated offset and the value of the free-running clock provides a local clock value that is approximately synchronized in time. The apparatus implementing the method is part of a node of a wireless station, and provides a time synchronization function, typically at the MAC layer. The method can be readily implemented in a combination of hardware and software.

An aspect of the invention is providing synchronized time without requiring real-time processing by software. Such aspects could assist simplifying timer circuitry.

Briefly, to provide the synchronized time, STAs use the contents of a free-running clock plus an offset. The offset is calculated in non real-time, e.g., in software, from received beacons. STAs and APs generate synchronization information for transmission and insert the synchronization information into a packet just before transmission. The synchronization information in one embodiment includes the sum of the free-running clock value taken at some known point in time and an adjustment factor.

BRIEF DESCRIPTION OF THE DRAWINGS

The present invention will be more fully understood from the description of the preferred embodiments of the invention, which, however, should not be taken to limit the invention to any specific embodiment but are for purposes of explanation and to provide a better understanding of the inventive apparatus and method. The preferred embodiments may be better understood with reference to the following figures.

DETAILED DESCRIPTION

The preferred embodiment of the inventive method and apparatus is implemented in a wireless network. One such network is specified by the IEEE 802.11 standard, described, for example, by ANSI/IEEE Std 802.11, 1999 Edition (ISO/IEC 8802-11:1999) Local and metropolitan area networks—Specific Requirements—Part 11: Wireless LAN Medium Access Control (MAC) and Physical Layer (PHY), and available from the IEEE. The inventive method and apparatus however may be applied to other wireless networks.

Figure 1A:
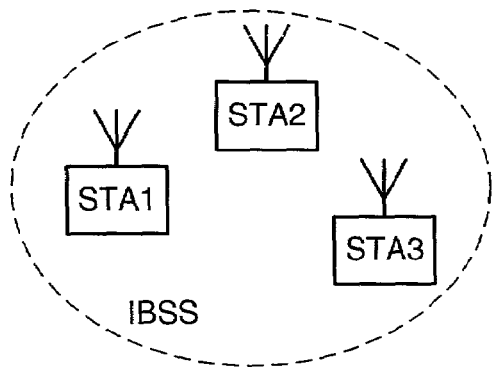
FIG. 1A shows a peer-to-peer wireless network.
Figure 1B:
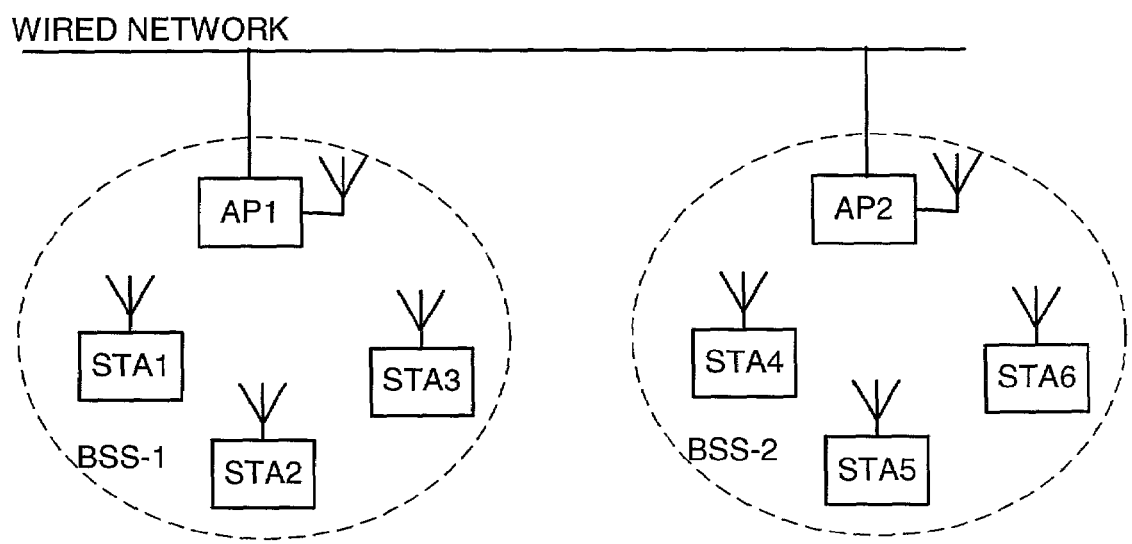
FIG. 1B shows a wireless network in which one node forms a bridge between the wireless network and a wired network.
Figure 1C:
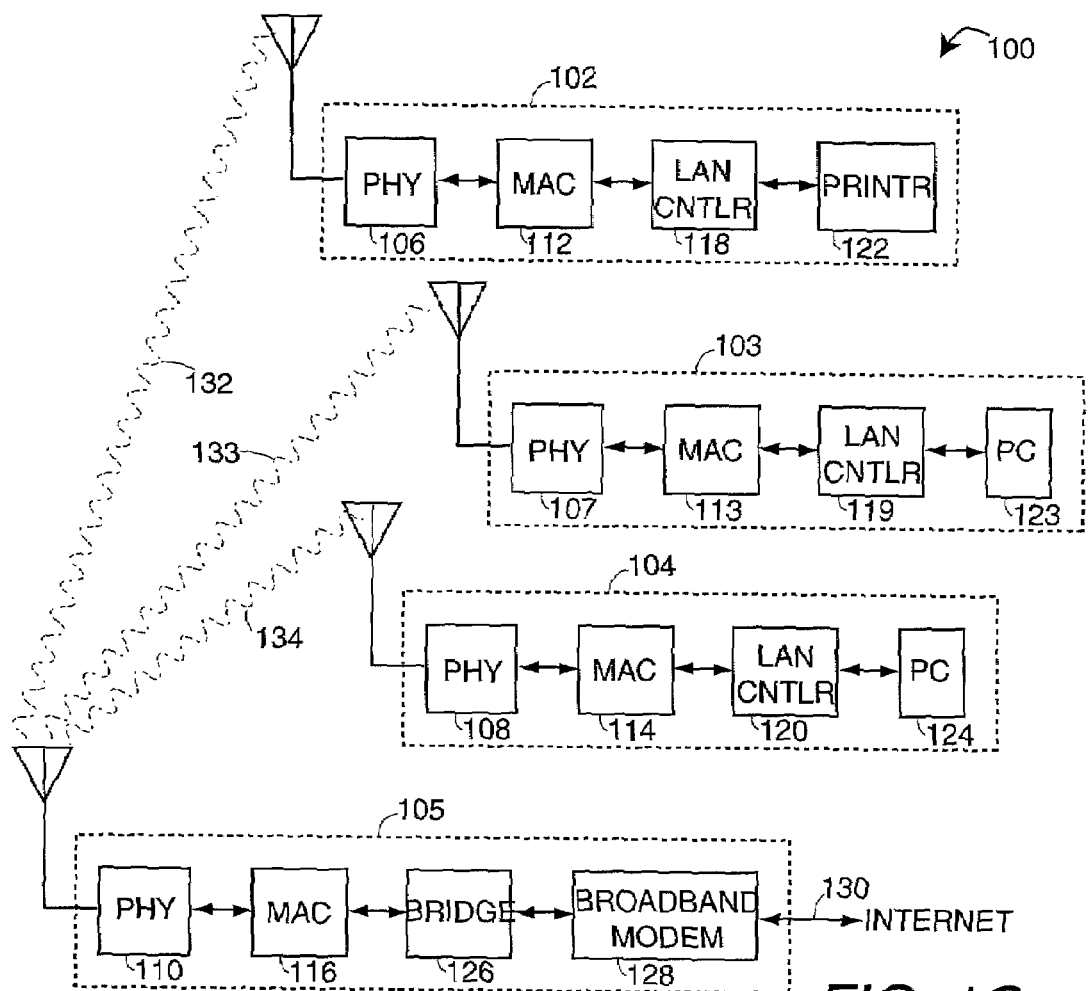
FIG. 1C shows in more detail an infrastructure basic service set (BSS) of stations that includes an AP.

FIG. 1C shows an infrastructure network. The BSS of FIG. 1C is referred to herein by the general reference numeral 100 and includes one or more wireless stations represented by units 102, 103 and 104, and another node 105 acting as an access point (AP) that may be connected to the Internet or an intranet or any other network. One or more of the wireless stations may be mobile. The access point routes data between the stations and other wireless stations. The AP may also allow mobile stations to roam to another AP and also is used to handle traffic from the mobile radio to the wired or wireless backbone of the network. Network 100 preferably operates according to the IEEE 802.11 standard.

In general, by a "node" of a wireless network is meant a wireless unit that is either an AP or an STA.

A physical layer interface (PHY) 106, 107, 108, and 110, provides each of the wireless interconnections. A media access control (MAC) controller 112, 113, 114, and 116, provides the next interface layer in a layered communications model. Each of the MAC controllers may include an embodiment of the present invention. A local area network controller 118, 119, and 120 is provided as a peripheral to a computer 123, 124 and, in this example, a printer 122. A bridge 126 interfaces the local area network (LAN) through a broadband modem 128 to the Internet 130. The broadband modem 128 can be implemented with DSL, ISDN, or even two-way satellite connections like Starband see www<dot>starband<dot>com, where <dot> means a period (".").

A plurality of radio communications, represented by radio links 132, 133, and 134, in one embodiment use the IEEE 802.11a protocol in the 5 GHz unlicensed band that specifies forty-eight active tones and four pilot tones in a 64-tone FFT coded orthogonal frequency division multiplexing (COFDM), and quadrature phase shift keying (QPSK). The modulated signals are transmitted in the 5 GHz frequency band. Other modes can also be used, e.g., 16 QAM and 64 QAM. Such are described in detail in the IEEE-802.11a standard available from the IEEE). Another embodiment uses the IEEE 802.11b protocol.

While the arrangement of FIG. 1C is prior art, a node (access point and non-access point) that includes an embodiment of the method and apparatus described herein is not prior art.

Figure 2:
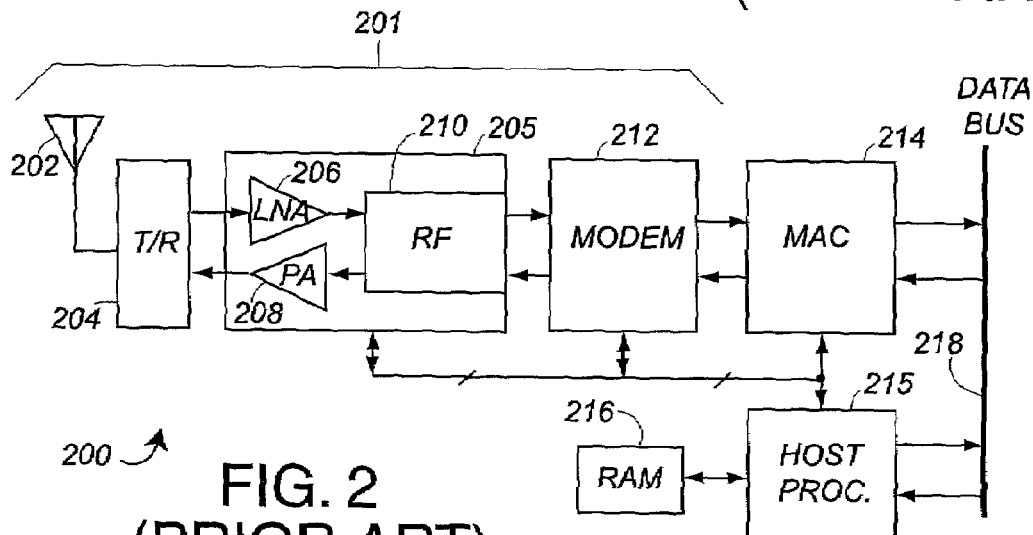
FIG. 2 shows a wireless station used as an AP in more detail.

FIG. 2 is a functional block diagram of a wireless communication node 200 for use in a wireless network. The node 200 might be, for example, part of a PCMCIA wireless LAN card embodiment, or of an access point device, and includes a physical layer interface (PHY) 201 that in one embodiment includes at least one antenna 202 for 5G Hz carrier service, a transmit/receive (T/R) switch 204 for half-duplex operation, and a wireless transceiver 205 such as that of FIG. 2 that includes a low-noise amplifier (LNA) 206, a power amplifier (PA) 208, and other radio frequency (RF) 210 transceiver components. The physical layer interface also includes a data modem 212 that deals with modulating and demodulating according to the PHY layer of the standard. The node 200 further includes a media access controller (MAC controller) 214 for layer-2 MAC processing. The MAC controller includes an embodiment of the present invention and operates according to the 802.11 MAC protocol that specifies the access schemes that provide fair access to the medium to the stations and the access point. A computer system databus 218 is accommodated. Interfaces may be included e.g., one or more interfaces that conform to well-known industry standards PCMCIA, PCI, USB, and so forth.

One optional component is a host processor 215. In one embodiment, the host processor is incorporated with the MAC controller 214. A random access memory (RAM) 216 is included for data buffering and program storage. The RAM 216 may be directly coupled to the host or to the MAC controller or to both.

In addition to the radio data between the modem, radio transceiver, and MAC controller, control information such as gain settings for the radio receiver from an automatic gain control module in the modem, and other data, may be communicated between the host (if included), the MAC, the modem and the wireless transceiver.

While a wireless node such as shown in FIG. 2 is prior art, such a node including a MAC controller that incorporates an embodiment of the inventive method or apparatus described herein is not prior art.

The 802.11 MAC standard uses a TSF timer to maintain time. The synchronization of TSFs in Stations (STAs) and Access Points (APs) supports, for example, power save functions and the Point Coordination Function (PCF). Synchronization between TSFs in STAs and APs is achieved using time synchronization information in packets that contain time synchronization information, e.g., using beacon packets that each includes a timestamp. The TSF timer is required to be a 64-bit value with 1 μs resolution and ±0.01% accuracy. Probe response frames also include time synchronization information.

Thus, an STA in an ad hoc network (IBSS) or an infrastructure network (BSS) receives packets containing time synchronization information, e.g., beacons, and synchronizes its local TSF timer to the network TSF using the time synchronization information in the received packet. The STA thus needs to determine the relationship between local TSF and the time synchronization information in the received packet. To do this, the STA relates the time, denoted $t_{IEEEE}$, that in the case of an IEEE 802.11b conforming network is the time of the first bit of the timestamp received from the medium, to its local TSF, and then, if necessary, adjusts its local TSF to maintain synchronization. In the case of an 802.11a conforming network that uses orthogonal frequency domain multiplexing (OFDM), $t_{IEEE}$ is the time of the start of the OFDM symbol that contains the first bit of the timestamp.

In an 802.11 system, a node such as an STA in an ad hoc network or an AP in an infrastructure network may transmit a data unit—a packet—that contains time synchronization information, such as a beacon that includes a timestamp. The timestamp represents the time that the first bit of the timestamp is transmitted onto the medium (IEEE 802.11b) or of the start of the OFDM symbol that contains the first bit of the timestamp. This time is again denoted $t_{IEEE}$ and needs to be related, i.e., synchronized to the actual time of the network using the local TSF that is synchronized to the network TSF, for example using some previously received time synchronization information. Thus, an STA in a BSS adjusts its local TSF so that it would have contained the same value as its AP at $t_{IEEE}$, and an STA in an IBSS adjusts its local TSF in the same way as an STA in a BSS only if its TSF is lagging the TSF in the STA of its IBSS that transmitted the beacon.

A synchronization method and implementation is required that does not depend on real-time processing such as real-time comparison and modification of a running timer. Described herein are embodiments of a synchronization method that avoids real-time processing in a BSS and an IBSS, and which can be mapped to a simple hardware/software implementation.

One node embodiment uses a free-running clock and calculates an offset in non real-time from received packets that include synchronization information, e.g., beacons. The synchronized TSF time is the sum of the free-running clock value and the offset.

One method embodiment applicable to an STA that includes a local free-running clock includes the STA receiving a packet that contains synchronization information, for example in a beacon packet having a timestamp field, and generating a local timestamp by taking a copy (in hardware) of the local free-running clock at a known receive reference point during reception of the packet. The method further includes the STA extracting the received timestamp from the timestamp field of the received beacon packet. The method further includes calculating an offset based on the received timestamp and the local timestamp. In the case that the STA is in a BSS, the offset is recalculated every time a beacon is received, and in the case that the STA is in an IBSS, the offset is recalculated if the local synchronized time lags the received synchronized time. The method further includes the STA using the sum of the local free-running clock and the most recently calculated offset as the synchronized time.

In the case that the STA is in a BSS, the method further includes recalculating the offset by using the received timestamp, subtracting the local timestamp, and also subtracting the difference between the points in the beacon referenced by the local timestamp and the received timestamp. The difference may be a function of the data rate.

In the case that the STA is in an IBSS, the method includes the STA only recalculating the offset using the received timestamp and local timestamp if the local synchronized time lags the received synchronized time.

In more detail, the method includes the STA in an IBSS canceling any outstanding beacon transmission, calculating an adjusted local timestamp by using the local timestamp, adding the time difference between the time points in the beacon referenced by the local timestamp and the received timestamp, and adding the previously calculated offset. The time difference may be a function of the data rate.

The method further includes the STA in an IBSS recalculating the offset if the adjusted local timestamp is less than the received timestamp. The recalculating uses the received timestamp, subtracts the local timestamp, and subtracts the time difference between the points in the beacon referenced by the local timestamp and the received timestamp. Again, the time difference may be a function of the data rate.

One method embodiment includes, for the case of transmitting, an STA or an AP inserting the sum of the free-running clock and an adjustment factor into transmitted beacons.

One method embodiment for an STA in an IBSS or an AP in a BSS transmitting a beacon includes sending the beacon and an adjustment factor for transmission to transmit hardware included in the transmitting station. The adjustment factor is calculated in the station by using the last calculated offset and adding the time difference between the time the hardware calculates the transmit timestamp, e.g., just before transmission and the time referenced by the transmit timestamp. The time difference may be a function of the data rate. The method further includes the transmitting station calculating a transmit timestamp by using the local free-running clock and adding the adjustment factor. In one embodiment, this transmit timestamp calculating is carried out in hardware just before transmission. The method further includes the transmitting station inserting the transmit timestamp into the beacon timestamp field. In one embodiment, this inserting is also carried out in hardware just before transmission.

Figure 3:
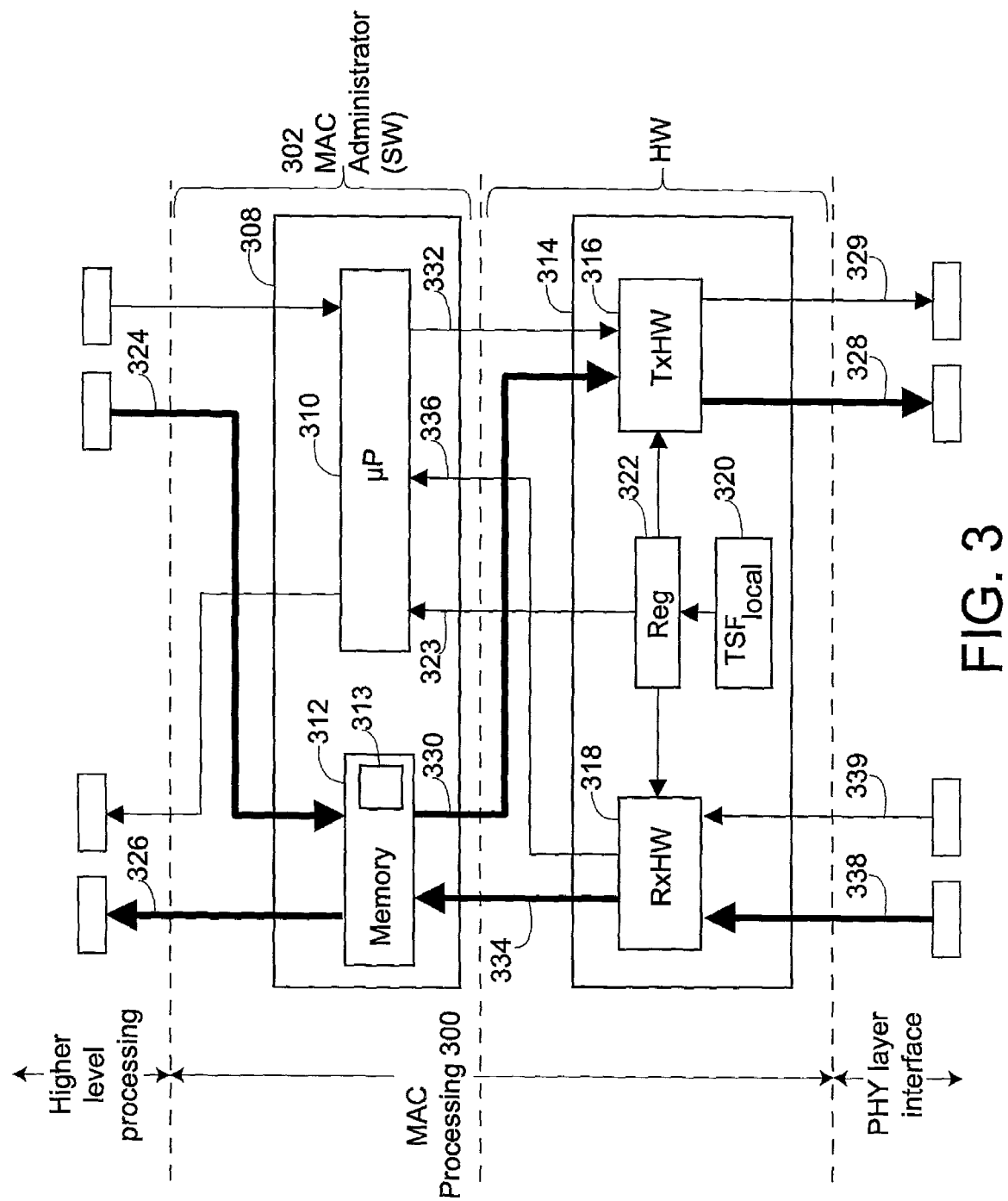
FIG. 3 shows in simplified block diagram form a MAC controller according to an embodiment of the invention.

FIG. 3 shows in simplified form a block diagram of an embodiment of a MAC controller 300 that includes a MAC administrator 302 and MAC packet hardware 314. The MAC packet hardware 314 includes a transmit hardware unit (TxHW) 316 that controls transmission of MAC protocol data and a receive hardware unit (RxHW) 318 that receives data that includes MAC protocol data. The MAC administrator 302 is connected to and receives data 324 from a data link (or higher) level interface of the wireless station and provides data 326 to the data link layer interface. The term "data link level interface" will be used herein to mean an interface for receiving data into and providing data from the layer immediately above the MAC layer, and such an interface may be implicit in the mechanism that processes data according to the layer immediately above the MAC. The MAC administrator 302 further provides data 330 and one or more control signals 332 to the transmit hardware 316, and accepts data 334 and one or more control signals 336 from the receive hardware 318. The MAC transmit hardware 316 sends data 328 and one or more control signals 329 to the physical layer for transmitting the data. The receive hardware 318 receives data 338 and one or more control signals 339 from the physical layer.

In one embodiment, the MAC administrator 302 includes a processing system 308 that has a processor (μP) 310 and a processor memory 312. The MAC transmit hardware and receive hardware (316 and 318) are sometimes referred to herein as the "hardware" or simply "HW," and whether the RxHW or TxHW or both is meant should be clear from the context. Data paths are shown heavier than are the control paths. The processor 310 runs program code is 313 shown here as part of processor memory 312. In the preferred embodiment, processor 310 is a microprocessor. Alternate embodiments may use different types of processors, including general-purpose microprocessors, microcontrollers, and digital signal processors (DSPs). The processor in some alternate embodiments may be the host processor 215 of FIG. 2. The program code in alternate embodiments may be in a different memory than memory 312, e.g., the processor may be implemented in a chip that includes on-chip memory for program storage, or may have an architecture with separate data memory and program memory paths. Program code 313 shown in memory 312 is used here to include all these configurations.

Thus one embodiment includes one or more computer readable code segments (e.g., software) that may be provided on a carrier medium e.g., in the memory or initially on a CD-ROM or otherwise, that cause the processor in processing system 308 to implement one or more of the tasks of the MAC administrator.

By "the software performs function X" is meant that "the program code 313 includes code to instruct the processing system 308 to carry out function X." Furthermore, the processing system 308 running the MAC-related program code is also referred to herein as the "software" or "SW." In one embodiment of the MAC processor 300, the transmit hardware 316 transmits frames in the form of MAC protocol data units (MPDUs) in a sequence while the RxHW receives and processes data from the PHY that includes an MPDU. By "the transmit hardware 316 transmits" is meant that the HW causes the physical layer interface (PHY) to transmit, and by "the receive hardware 318 receives" is meant that the HW receives and processes data 338 from the physical layer interface (PHY), the processing including, for example, determining that the received data 338 includes an MPDU that has timing information and is directed at this station (AP or STA).

The MAC receive hardware 318 processes MPDUs received in the PHY and passed from the PHY to the MAC layer 300 for MAC processing. The MAC receive hardware 318 includes a "filter" that generates control signals to indicates successful reception of various types of MPDUs for this destination. Not shown in FIG. 3 are the various control signals and the receive processing elements other than the generation of the shown control signals.

The hardware 314 includes a free-running clock 320 and, in one embodiment, a register 322. The value of the clock 320 can be copied in hardware to the register 322 at any point in time. In one embodiment, the free-running clock 320 increments every 1 μs. The MAC processor 300 provides at least the MAC functions specified in the IEEE 802.11 standard.

In the following more detailed description, the quantities $TSF_{beacon\ in}$, $TSF_{local}$, $TSF_{local\ in}$, $T_{offset\ in}$, $T_{offset}$, $TSF_{local\ out}$, $T_{offset\ out}$, and $TSF_{beacon\ out}$ are defined as follows.

$TSF_{beacon\ in}$ denotes the value of a timestamp contained in a received beacon packet. According to the IEEE 802.11 standard, each beacon packet contains a timestamp.

$TSF_{local}$ denotes the output of the free-running hardware clock 320 that, in one embodiment, has 1 μs increments.

$TSF_{local\ in}$ denotes the value of the contents of register 322, i.e., a copy of $TSF_{local}$ that is obtained at a known point in time during reception. This time point is denoted herein by $t_{ref}$.

$T_{offset\ in}$ denotes where the point in which the timestamp is contained is located in the packet in relationship to the $TSF_{local\ in}$ reference point $t_{ref}$. This timestamp location in time, denoted herein by $t_{IEEE}$, is defined by the standard, e.g., the IEEE 802.11 standard. This $T_{offset\ in}$ is thus the difference between $t_{ref}$ and $t_{IEEE}$ and is used as an adjustment of $TSF_{local}$ to account for this difference. This adjustment may be a function of the receive rate. In one embodiment, $T_{offset\ in}$ is determined by MAC administrator 302, e.g., in software.

$T_{offset}$ denotes the adjustment of $TSF_{local}$ to account for the difference to the synchronized TSF. In one embodiment, $T_{offset}$ is determined by MAC administrator 302, e.g., in software.

$TSF_{local\ out}$ denotes the value of the contents of register 322, i.e., a copy of $TSF_{local}$ that is obtained at a known point in time, again denoted $t_{ref}$, during the transmission process.

$T_{offset\ out}$ denotes where the point in which the timestamp is to be transmitted is to be located in the packet in relationship to the $TSF_{local\ out}$ reference point $t_{ref}$. $T_{offset\ out}$ provides the adjustment of the sum of $TSF_{local\ out}$ and $T_{offset}$ to account for the difference between $t_{ref}$, the reference point of $TSF_{local\ out}$ and $t_{IEEE}$, the timestamp location reference point defined in the standard being used, e.g., the IEEE 802.11 standard. Again, this adjustment can be a function of the transmit rate. In one embodiment, $T_{offset\ out}$ is determined by MAC administrator 302, e.g., in software.

$TSF_{beacon\ out}$ denotes the timestamp value that is inserted into an outgoing beacon MPDU for transmission.

Figure 4A:
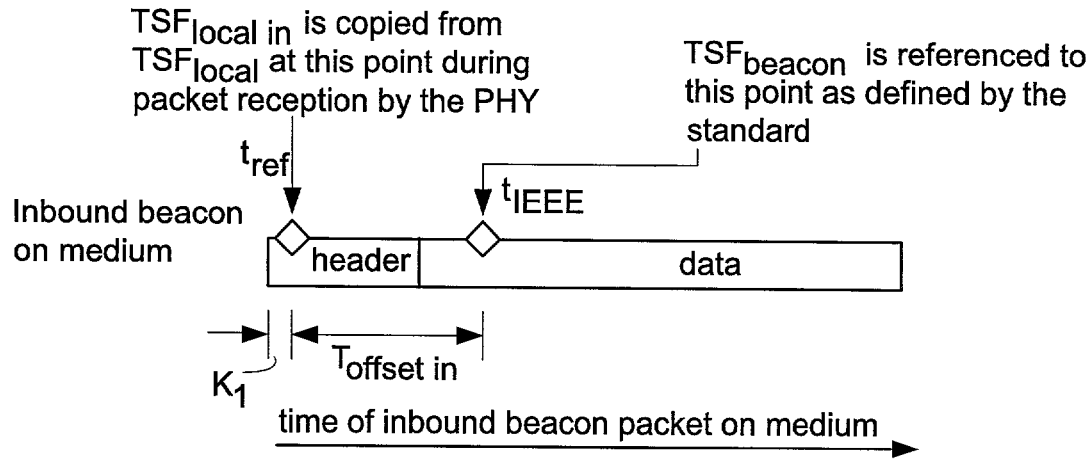
FIG. 4A shows the time relationships of the offset quantities and a received beacon data unit according to one embodiment of the method for receiving a beacon MAC data unit.
Figure 4B:
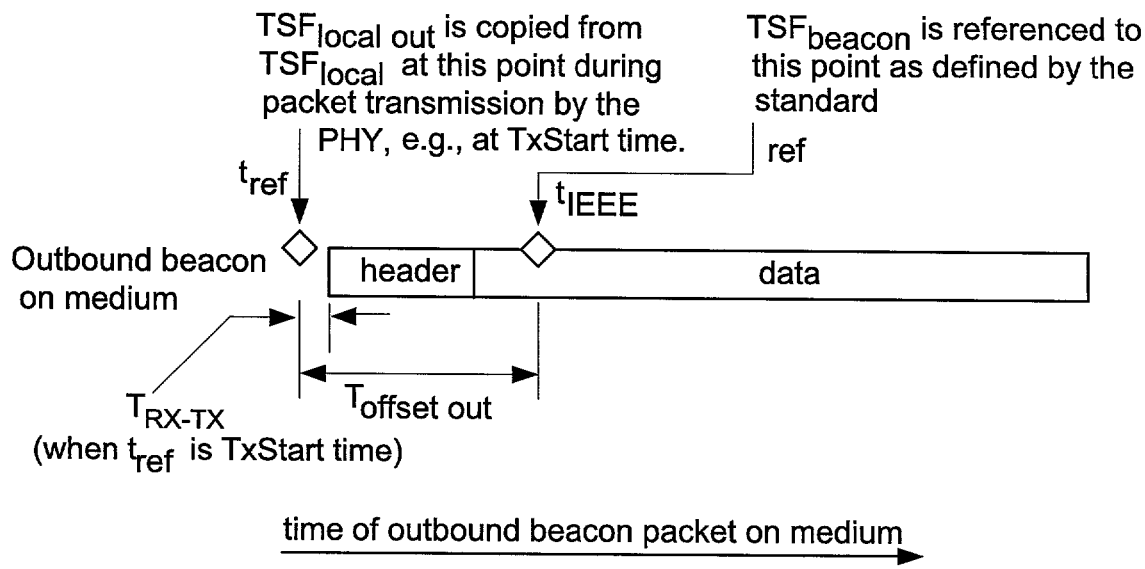
FIG. 4B shows the time relationships of the offset quantities and a beacon data unit to be transmitted according to one embodiment of the method for transmitting a beacon MAC data unit.

FIG. 4A shows the time relationships of the offset quantities and a received beacon data unit according to one embodiment of the method for receiving a beacon MAC data unit, and FIG. 4B shows the time relationships of the offset quantities and a beacon data unit to be transmitted according to one embodiment of the method for transmitting a beacon MAC data unit. In each of these, the MAC data unit includes header information, and the payload where the timestamp is located (shown as "data").

The methods and apparatuses implementing TSF synchronization are now discussed in more detail. While the implementation is mostly described in terms of beacons, such as IEEE 802.11 standard beacons, the same concepts also apply to any packets containing time synchronization information, for example probe responses, with some variation in the processing. How to so modify the processing would be clear to one of ordinary skill in the art.

Figure 5:
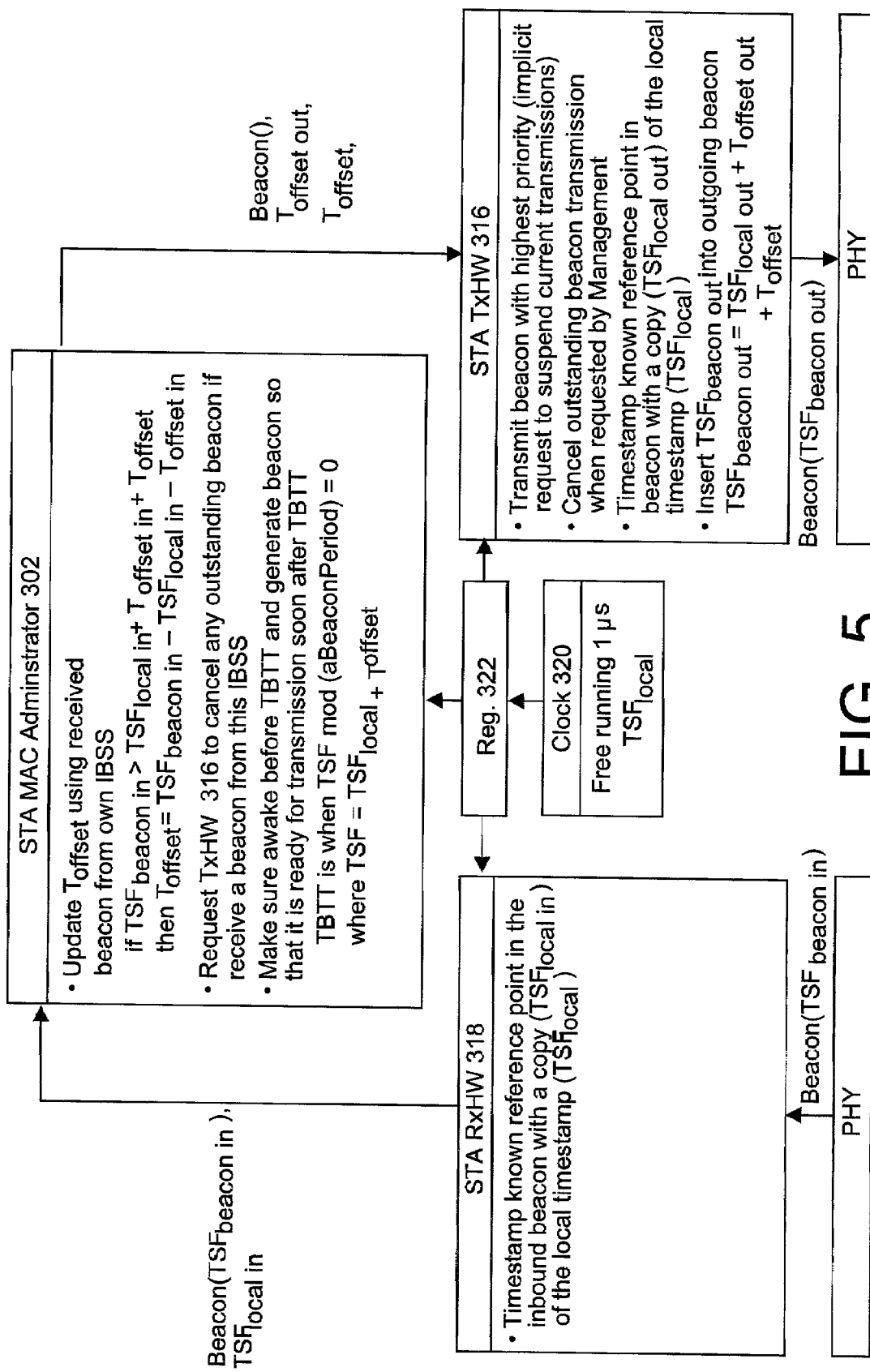
FIG. 5 shows the steps different elements of a station perform in an an-hoc network (IBSS) receiving a beacon MAC data unit and transmitting a MAC data unit that includes a timestamp according to one embodiment of the invention applicable to the case of a peer-to-peer network.

FIG. 5 shows how the different elements in an STA that is part of an ad hoc network (an IBSS) use the quantities defined above to receive and to transmit synchronization information in beacons as illustrated in FIGS. 4A and 4B.

Consider first the reception of a packet containing synchronization information. Suppose the RxHW 318 receives a packet from the PHY that includes a beacon MPDU containing a timestamp $TSF_{beacon\ in}$. Referring to FIG. 4A, at some selected reference point in time shown as $t_{ref}$ after reception starts, the RxHW copies in hardware a copy of the free-running clock 320 ($TSF_{local}$) into register 322, i.e., $TSF_{local\ in}$ is obtained. If the MPDU is a beacon, then the timestamp is specified to be at some point defined by the standard, shown in FIG. 4A as $t_{IEEE}$.

Figure 8:
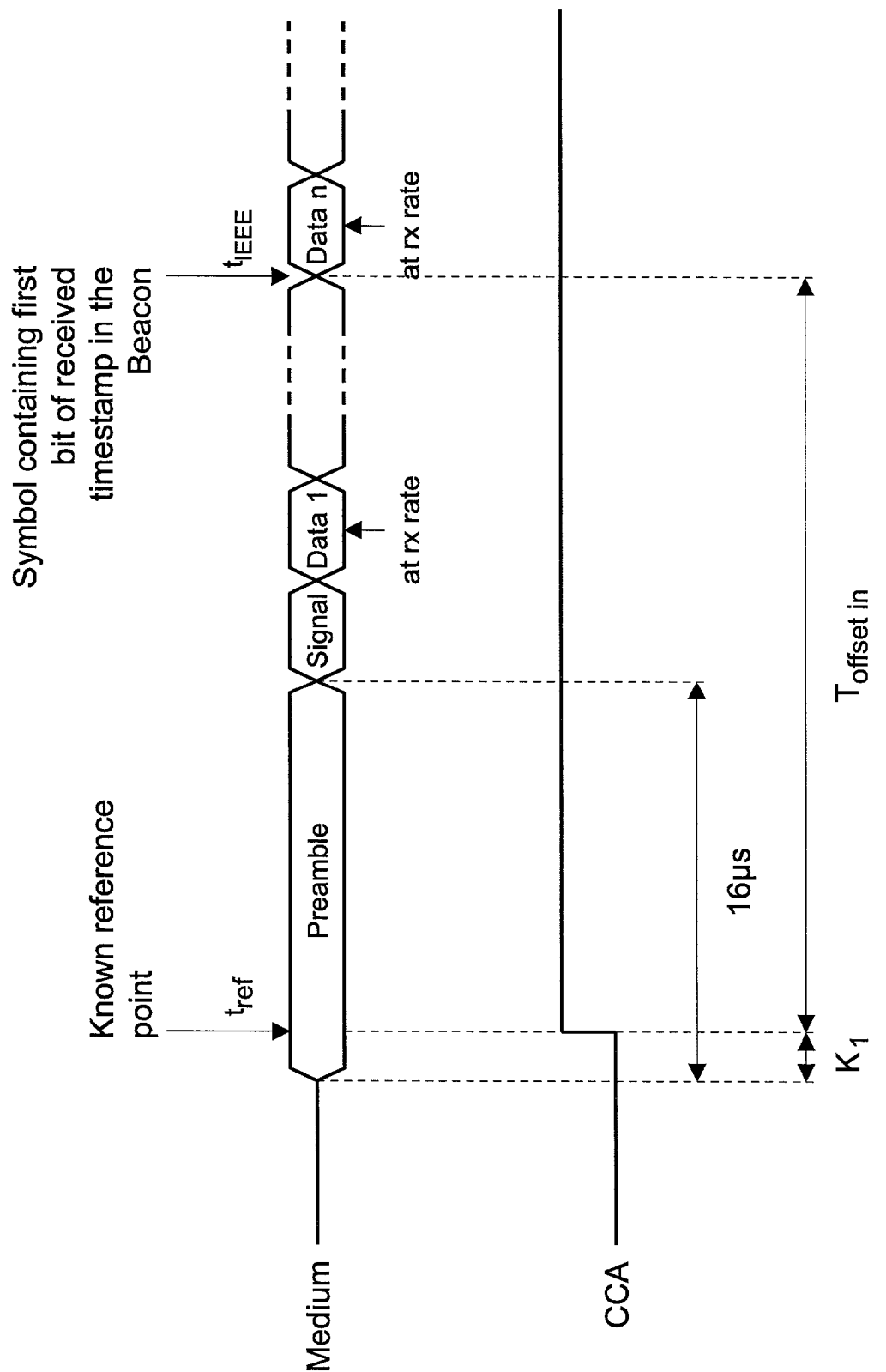
FIG. 8 shows a packet arriving at the medium in the case of the IEEE 802.11a standard, the relationship of the various times defined herein and used in one or more embodiments to provide a synchronized TSF timer.

FIG. 8 illustrates a packet arriving at the medium for the case of the IEEE 802.11a standard for communicating using OFDM symbols. An IEEE 802.11a packet includes a 16 μs preamble that allows for start of packet detection, automatic gain control, frequency offset correction, and symbol synchronization. The header includes a first field encoded at 6 Mbps (megabits per second) that includes information about the data rate of the rest of the packet, followed by several symbols at that data rate. One of these, at time $t_{IEEE}$, is the symbol in which the first bit of the timestamp in a beacon packet resides.

The reference time $t_{ref}$ is related to the time that a packet is received on the medium. The PHY provides this information, i.e., the PHY can determine the start of packet time. During reception, the PHY generates a start of packet signal. The receive hardware 318 asserts a clear channel assessment (CCA) just after energy is received that might indicate reception of a MAC Protocol data unit (MPDU). In one embodiment, the receive reference point $t_{ref}$ is relative to the time that CCA is asserted, and in one version is the time the CCA is asserted. The time from the start of packet to $t_{ref}$, i.e., to when a CCA asserted is denoted by time $K_1$, as shown in FIG. 8.

Referring again to FIG. 5, thus, when the MAC receive hardware 318 receives an MPDU, the hardware copies $TSF_{local}$ to $TSF_{local\ in}$ at the receive reference point $t_{ref}$, e.g., when CCA is asserted. The receive hardware 318 receives the MPDU and transfers the received MPDU to the MAC administrator 302, including the timestamp $TSF_{beacon\ in}$ if the MPDU is a beacon packet-denoted Beacon($TSF_{beacon\ in}$). The receive hardware 318 also transfers the received rate in the Physical Layer Convergence Protocol (PLCP) header, and transfers the copied running clock $TSF_{local\ in}$ as an additional field.

In the MAC administrator 302, e.g., the software accepts the MPDU from the RxHW 318. If the MPDU is not a beacon, the MAC administrator 302 uses $TSF_{local\ in}$ as the timestamp for debugging or sniffer purposes. If the MPDU is a beacon from the same IBSS, the processor carries out the following steps:

Calculating $T_{offset\ in}$, the time from $t_{ref}$ to $t_{IEEE}$ where the first bit of the received timestamp resides. As seen in FIG. 8 for the IEEE 802.11a case, the start of the timestamp depends on the data rate (and the modulation) as well as the reference point $t_{ref}$.

If the local synchronized time lags the received synchronized time (i.e., if the beacon time $TSF_{beacon\ in}$ is greater than the sum of the copied clock $TSF_{local\ in}$, the adjustment $T_{offset\ in}$, and the last available adjustment $T_{offset}$) calculating $T_{offset}=TSF_{beacon\ in}-TSF_{local\ in}-T_{offset\ in}$.

The STA subsequently uses $TSF_{local}+T_{offset}$ as the synchronized TSF time.

In one embodiment, calculating $T_{offset\ in}$ as a function of the receive rate and the receive reference point includes knowing the interval between the start of the preamble and the known reference point for the different receive rates. This is typically can be derived from the standard. As an example, in the case of the IEEE 802.11a standard for transmission using OFDM, calculating $T_{offset\ in}$ uses the information given by Table 1, where the data rate is shown in Mbps. $N_{DBPS}$ is the number of data bits per OFDM symbol at that rate, symbol with the first timestamp is also a function of the rate, and $K_1$ is the interval between the start of the preamble and the known reference point $t_{ref}$.

TABLE 1

| Rate (Mbps) | $N_{DBPS}$ | Symbol with 1st bit of timestamp | $T_{offset\ in}$ (μs) |
|---|---|---|---|
| 6 | 24 | 10 | 52 − $K_1$ |
| 9 | 36 | 7 | 40 − $K_1$ |
| 12 | 48 | 6 | 36 − $K_1$ |
| 18 | 72 | 4 | 28 − $K_1$ |
| 24 | 96 | 4 | 28 − $K_1$ |
| 36 | 144 | 3 | 24 − $K_1$ |
| 48 | 192 | 3 | 24 − $K_1$ |
| 54 | 216 | 2 | 20 − $K_1$ |

If the received beacon is from this IBSS, the MAC administrator 302 also requests the MAC TxHW 316 to cancel any outstanding beacon.

The MAC administrator 302, e.g., the processor 310 further makes sure that the hardware is awake before the next target beacon transmission time (denoted TBTT) when the next beacon might be received. TBTT is when the synchronized time, denoted TSF and equal to the sum of the local running clock $TSF_{local}$ and the adjustment $T_{offset}$, is some multiple of the Beacon Period (denoted aBeaconPeriod).

Figure 7:
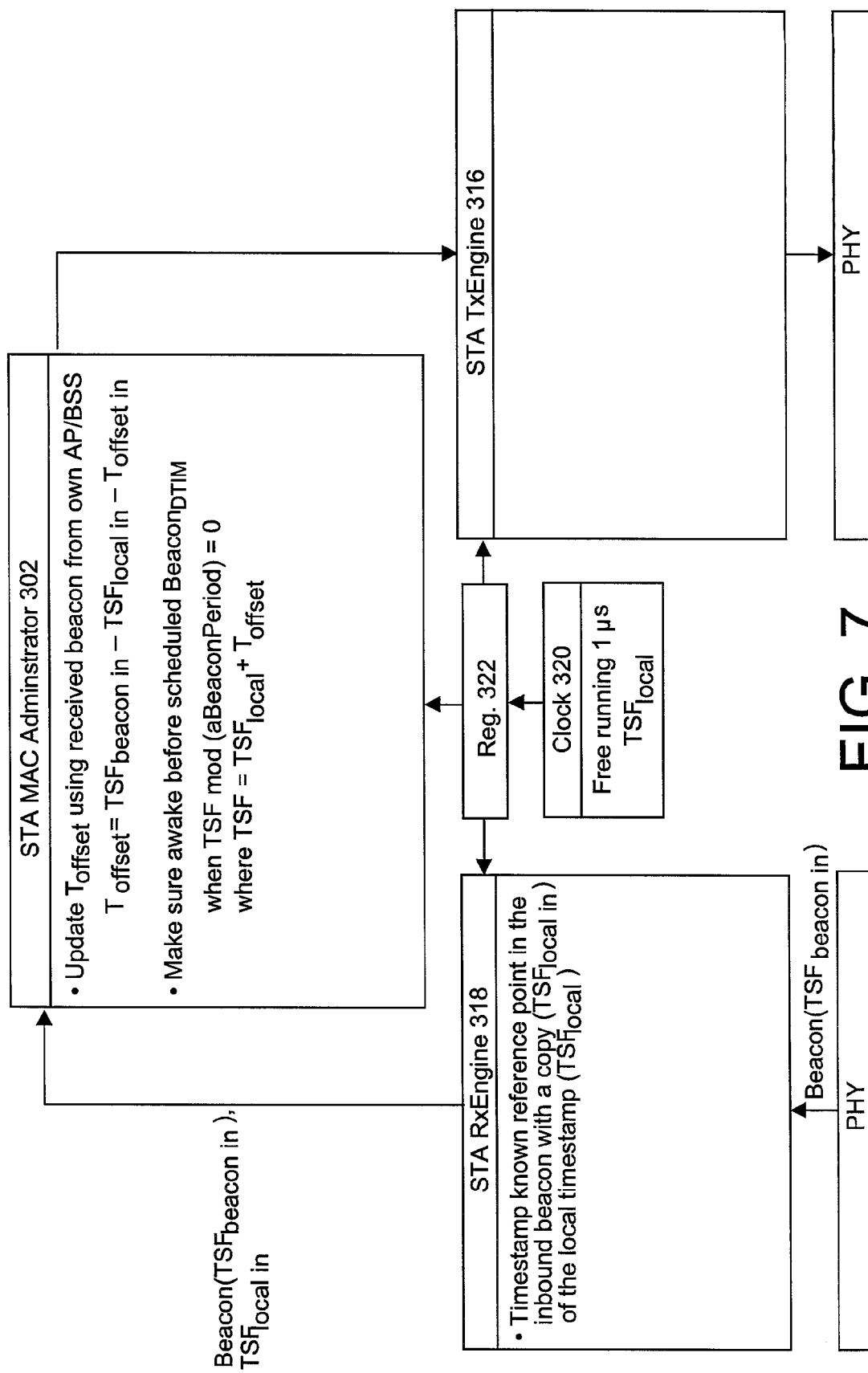
FIG. 7 shows the steps different elements of a station perform in an infrastructure network (BSS) receiving a beacon MAC data unit from an access point according to one embodiment of the invention applicable to the case of an infrastructure network.

FIG. 7 shows how the different elements in an STA that is part of an infrastructure network (a BSS) use $TSF_{beacon\ in}$, $TSF_{local}$, $TSF_{local\ in}$, $T_{offset\ in}$ and $T_{offset}$ to receive a packet containing synchronization information, e.g., from a beacon. In particular, FIG. 7 shows the functions performed by the receive hardware 318 and by the MAC administrator 302, e.g., by the software, for the case of an STA in a BSS receiving a beacon packet. This follows the case shown in FIG. 5 of an STA in an IBSS receiving a packet containing synchronization information, except that the offset is always recalculated. Referring to FIGS. 4A and 8, at some known reference point in time shown as $t_{ref}$ after reception starts, e.g., at the CCA assertion time, the RxHW copies in hardware a copy of the free-running clock 320 ($TSF_{local}$) into register 322, i.e., $TSF_{local\ in}$ is obtained. The beacon packet—enoted Beacon($TSF_{beacon\ in}$)—containing the timestamp $TSF_{beacon\ in}$ and the copied quantity $TSF_{local\ in}$ are provided to the MAC administrator 302.

The MAC administrator 302, e.g., the software performs the following steps. The adjustment $T_{offset}$ is updated using a beacon received from the station's own AP in the BSS. In particular, $T_{offset}$ is updated to the sum of the beacon time $TSF_{beacon\ in}$, less the sum of the copied clock $TSF_{local\ in}$ and the adjustment $T_{offset\ in}$:

$$T_{offset}=TSF_{beacon\ in}-(TSF_{local\ in}+T_{offset\ in}).$$

The MAC administrator, e.g., the software makes sure that the STA is awake before the scheduled beacon delivery traffic indication message (DTIM). This is when the synchronized time (denoted TSF and equal to $TSF_{local}+T_{offset}$) is a multiple of the DTIM period, i.e., $(TSF_{local}+T_{offset})\bmod (aDTIMPeriod*aBeaconPeriod)=0.$ The case of transmitting a beacon at some target beacon transmission time (denoted TBTT) is now described, first with reference to FIG. 5 for the case of an STA in an IBSS. The MAC administrator 302, e.g., the software generates the beacon so that it is ready for transmission soon after TBTT. The time the start of transmission command is issued, i.e., the time that a signal TxStart is asserted is chosen as the transmit reference point $t_{ref}$. According to the IEEE 802.11 standard MAC, TxStart is asserted at a time before the preamble energy hits the medium during a short interframe space (SIFS), a Point Coordination Function Interframe space (PIFS), a Distributed Coordination Function Interframe space (DIEFS), or a slot boundary. In one IEEE 802.11a embodiment, once TxStart is asserted, the PHY may need time to turn around to transmit mode. The actual transmission of energy starts after the radio turnaround time, denoted $T_{RX-TX}$. See FIG. 4B.

To transmit a beacon, the MAC administrator 302, e.g., the software obtains information on how $T_{offset\ out}$ is related as a function of the transmit rate and the transmit reference point $t_{ref}$. The MAC administrator calculates the sum $T_{offset}+T_{offset\ out}$, and transfers to the transmit hardware 316 the beacon MPDU.

The transmit hardware, TxHW 316, accepts the MPDU from the MAC administrator 302. TxHW316 transmits the beacon with the highest priority. TxHW 316 copies the running clock 320 to register 322 at a selected reference point that is prior to the start of transmission, shown as $t_{ref}$ in FIG. 4B, i.e., a copy $TSF_{local\ out}$ of the running clock $TSF_{local}$ is obtained. In one embodiment, $t_{ref}$ is when TxStart for the MPDU is asserted. The beacon timestamp $TSF_{beacon\ out}$ is inserted into the outgoing beacon. The beacon timestamp time as required by the IEEE 802.11 standard is shown as $t_{IEEE}$ in FIG. 4B.

The transmit hardware calculates and inserts $TSF_{beacon\ out}=TSF_{local\ out}+(T_{offset}+T_{offset\ out})$ into the beacon timestamp field of the outgoing MPDU.

In one embodiment, calculating $T_{offset\ out}$ as a function of the transmit rate and the transmit reference point includes knowing the interval between the start of the preamble and the known reference point $t_{ref}$, and the transmit rate. For an embodiment applicable to the IEEE 802.11a standard, $T_{offset\ out}$ is calculated, for example from the information shown in Table 2, where $T_{RX-TX}$ is the radio turnaround time and TxStart initiates an immediate turnaround. The IEEE 802.11a standard requires the radio turnaround time to be less than 2 μs. In one IEEE 802.11a implementation of the PHY, the turnaround time is known and user settable.

TABLE 2

| Rate (Mbps) | $N_{DBPS}$ | Symbol with 1st bit of timestamp | $T_{offset\ out}$ (μs) |
|---|---|---|---|
| 6 | 24 | 10 | 52 + $T_{RX-TX}$ |
| 9 | 36 | 7 | 40 + $T_{RX-TX}$ |
| 12 | 48 | 6 | 36 + $T_{RX-TX}$ |
| 18 | 72 | 4 | 28 + $T_{RX-TX}$ |
| 24 | 96 | 4 | 28 + $T_{RX-TX}$ |
| 36 | 144 | 3 | 24 + $T_{RX-TX}$ |
| 48 | 192 | 3 | 24 + $T_{RX-TX}$ |
| 54 | 216 | 2 | 20 + $T_{RX-TX}$ |

The MAC transmit HW 316 causes the beacon denoted Beacon($TSF_{beacon\ out}$) with this timestamp $TSF_{beacon\ out}$ to be transmitted by the PHY.

Figure 6:
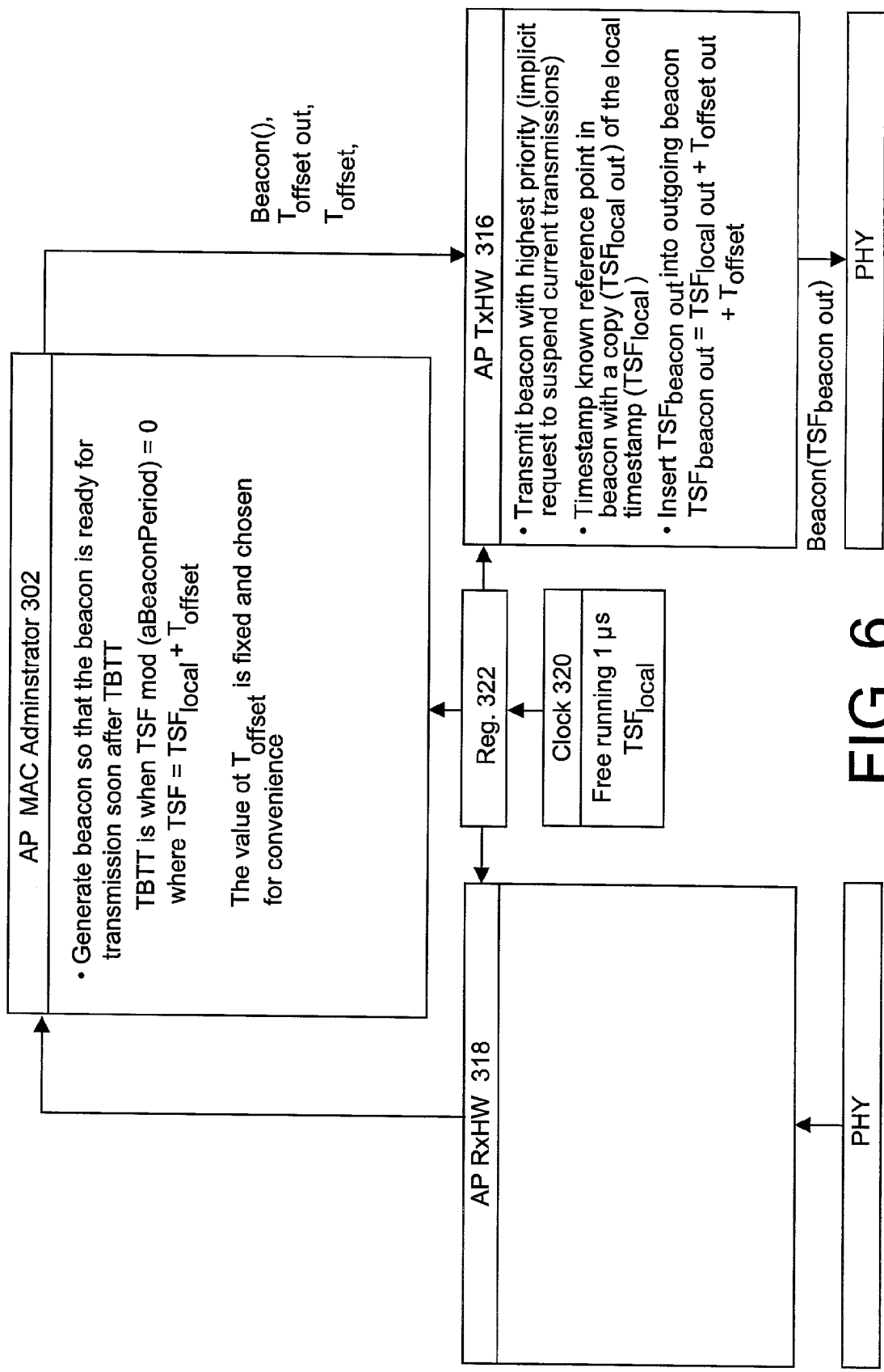
FIG. 6 shows the steps different elements of a station acting as an access point (AP) perform in an infrastructure network (BSS) transmitting a beacon MAC data unit according to one embodiment of the invention applicable to the case of an infrastructure network.

FIG. 6 shows how the different elements in an AP that is part of a BSS use $TSF_{local}$, $T_{offset}$, $TSF_{local\ out}$, $T_{offset\ out}$ and $TSF_{beacon\ out}$ to transmit synchronization information in a beacon. This occurs in a manner similar to the transmission in an IBSS described above. The MAC administrator 302 generates the beacon so that it is ready for transmission soon after TBTT. As before, TBTT is when the TSF, equal to the sum of the local running clock $TSF_{local}$ and some fixed conveniently selected adjustment $T_{offset}$, is some multiple of aBeaconPeriod, i.e., $(TSF_{local}+T_{offset})\bmod(aBeaconPeriod)=0.$ The MAC administrator 302 prepares and provides the TxHW 316 the beacon for transmission, the adjustment $T_{offset\ out}$ to the copied clock, and the fixed selected running clock adjustment $T_{offset}$. The transmit HW 316 transmits the beacon. To transmit the beacon, the TxHW 316 timestamps a known selected reference point that is prior to the start of transmission, shown as $t_{ref}$ in FIG. 4B, with a copy $TSF_{local\ out}$ of the running clock $TSF_{local}$, and then inserts the beacon timestamp TSFbeacon out into the outgoing beacon. The beacon timestamp is required by the IEEE 802.11 standard to be referenced to the point shown as $t_{IEEE}$ in FIG. 4B, The inserted timestamp is $TSF_{beacon\ out}=TSF_{local\ out}+T_{offset\ out}+T_{offset}.$ The transmit HW 316 causes the beacon denoted Beacon ($TSF_{beacon\ out}$) with this timestamp $TSF_{beacon\ out}$ to be transmitted by the PHY.

The above discussion described synchronization with beacon signals. WLANs may use other timestamp information. For example, the IEEE 802.11 standard specifies active scanning to scan for a particular BSS having some service set identifier (SSID). To actively scan, the STA transmits management frames called Probe Requests containing the desired SSID, and subsequently receives Probe Response frames that also contain timing information. This timing information is typically processed in a similar way to Beacon information. The above methods and apparatuses are also applicable to Probe Responses, and how to modify the invention to work with Probe Responses would be clear to one of ordinary skill in the art from the description herein. Thus the invention is applicable to processing received timestamp information whether in Beacons, Probe Responses, or other such signals, so that the word "Beacon" in the claims and elsewhere can be understood to include an IEEE 802.11 Beacon, an IEEE 802.11 Probe Response, and other such other mechanisms, whether conforming to the IEEE 802.11 standard or not.

In one embodiment, the TSF method and apparatus uses 64 bit arithmetic in order to meet the TSF accuracy specified in the IEEE 802.11 standard. The 64 bit operations in one embodiment include addition, subtraction, comparison, modulus, and multiplication.

In this manner, an STA can account for any drift between the local TSF and the TSF in the AP (in a BSS) and other STAs (IBSS or BSS). The synchronized TSF can then be used by an STA to determine, for example, when it should wake up or set the network allocation vector (NAV) for a contention-free period (CFP).

Various modifications are possible. For example, the embodiment shown in FIG. 3 includes a single register 322 for copying the free-running hardware clock 320, and the register contents are available to one or more of the RxHW, the TxHW, and the MAC administrator. The IEEE 802.11a standard is for half duplex communication, so at any time the register contents need only be available to either the RxHW or TxHW. An alternate embodiment provides two registers, one in the TxHW and the other in the RxHW that each are connected to and are to copy the contents of the free-running clock 320. Such an alternate embodiment may be more suitable for full-duplex communication.

Note that while the particular embodiment implements the MAC administrator with a processing system that includes a processor and a memory that contains programming instructions for the processor to perform the functions described herein, an alternate embodiment has a dedicated hardware MAC administrator that includes a management engine, wherein such basic functions as described above and loading an execution data set are hard wired, for example, as one or more state machines. Such a MAC administrator in one embodiment further includes a processor for implementing programmable aspects. Thus, the term MAC administrator is used herein to mean either the processing system, or a MAC administrator that includes dedicated hardware and, in some embodiments, a processor.

Furthermore, those skilled in the art will recognize that some or all of the functions of the receive hardware or the transmit hardware or both may also be implemented using a processor, so long as the implementation is sufficiently fast to ensure that the time-critical tasks can be successfully carried out. This might require a fast and expensive processor.

The term data unit typically refers to a packet of information, i.e., to a data packet. The invention is applicable to receiving other forms of data units. The term data signal is sometimes used to indicate a data unit that may or may not be in the form of a packet, or may be several packets, or some other form, depending on the protocol of the network in which an embodiment of the invention is used.

The term "synchronization information" is used herein to refer to the information included in packets such as beacons and probe responses to provide for synchronization. Typically, this synchronization information is in the form of a timestamp. An alternate embodiment may use other types of information, e.g., information from which a timestamp can be derived. Thus, the term "timestamp" is meant to include any type of synchronization information that may be included in some data units. How to modify the embodiments described herein for such other types of synchronization information would be clear to those skilled in the art from the definitions of the particular type of synchronization information.

The description above uses language such as "copying" a local free-running clock and "taking a copy" of the value of the free-running clock. One embodiment includes a register into which the value of the free-running clock at some point of time may be transferred. The term copy includes carrying out all methods of reading the value of the free-running clock at the point of time, including using one or more registers.

Furthermore, one embodiment described above includes a register into which the value of the free-running clock is read. The receive hardware and the transmit hardware have access to this register. An alternate embodiment includes a register in the receive hardware connected to the free-running clock and into which the value of the free-running clock is read, and a separate register in the transmit hardware connected to the free-running clock and into which the value of the free-running clock is read.

In the above description, the reference time $t_{ref}$ is related to the time that a packet is received on the medium, and in one embodiment, is related to the time that a CCA signal is asserted, other embodiments define the reference time relative to some use other signal, e.g., to one of several signals related to the start-of-packet signal that the PHY generates. An IEEE 802.11a packet has a preamble that contains various items of information having a known structure, e.g., a set of short symbols, and a set of long symbols, and a transition point between long and short symbols time. Alternate embodiments for IEEE 802.11a networks, may include a PHY that determines different sets of one or more of these signals, and the reference time for copying the clock may be related to any of these reference points.

While an embodiment has been described for operation according to the IEEE 802.11 standard, and in particular, the IEEE 802.11a standard that uses OFDM, the invention may be embodied in nodes conforming to other IEEE standards that may use OFDM, e.g., the IEEE 802.11g standard, and for other WLAN or communication standards, including, for example, the IEEE 802.11b standard, bluetooth, GSM, PHS, and other cellular wireless telephony standards, wherever accurate time synchronization, e.g., at the MAC level is required. Other such applications include wireless Ethernet, Hiperlan I, Hiperlan II, and multimedia mobile access communication (MMAC) systems, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), and so forth, in the case that time synchronization is desired.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method of synchronizing a local clock value in a wireless receiver receiving a data unit containing synchronization information, the method comprising:
    receiving a first data unit containing synchronization information transmitted by a first transmitter having a local clock value;
    copying a local free-running clock at a known reference point in time relative to the time the first data unit was received to generate a local timestamp;
    extracting the synchronization information from the received first data unit; and
    calculating an offset to the free-running clock using the extracted synchronization information and the local timestamp, the calculating in non real-time,
such that the sum of the calculated offset and the value of the free-running clock provides a local clock value for the receiver, and such that the receiver's local clock value is approximately synchronized in time to the local clock value of the first transmitter.

2. A method as recited in claim 1, wherein the wireless receiver is part of a node of a wireless data network, and wherein the data unit containing synchronization information is a beacon.

3. A method as recited in claim 2, wherein the node is a station in an ad hoc network.

4. A method as recited in claim 2, wherein the node is a station in an infrastructure network.

5. A method as recited in claim 1, wherein the wireless receiver is part of a node of a wireless data network, and wherein the data unit containing synchronization information is a probe response.

6. A method as recited in claim 1, wherein the offset relates the known reference point in time to the location in the received first data unit of the extracted synchronization information.

7. A method as recited in claim 1, further comprising:
updating the receiver's local clock value from a second data unit containing synchronization information, the updating including:
receiving the second data unit containing synchronization information transmitted by a second transmitter having a local clock value;
copying the local free-running clock at a second known reference point in time relative to the time the second data unit was received to update the local timestamp;
extracting the synchronization information from the received second data unit; and
re-calculating the offset to the free-running clock using the extracted synchronization information from the second data unit, the re-calculating in non real-time, the re-calculated offset relating the second known reference point to the location in the received second data unit of the extracted synchronization information and to the time the data unit was received, the re-calculating forming a re-calculated offset,
such that the receiver's local clock value is approximately synchronized in time to the local clock value of the second transmitter.

8. A method as recited in claim 7, wherein the receiver is part of a station in an infrastructure network, wherein the extracted synchronization information from the received second data unit is a second received timestamp value, and wherein re-calculating the offset includes:
forming the re-calculated offset as the second received timestamp less the copied free running clock value and less the difference between the second known reference point in time and the location in the received second data unit of the extracted synchronization information.

9. A method as recited in claim 8, wherein the difference between the second known reference point and the location in the received second data unit of the extracted synchronization information is a function of the data rate.

10. A method as recited in claim 7, wherein the receiver is part of a station in an ad hoc network and wherein the updating is carried out only if the receiver's local clock value lags the time using the re-calculated offset.

11. A method as recited in claim 10, further comprising:
the station cancelling any outstanding beacon transmission;
wherein the re-calculating the offset includes:
forming the re-calculated offset as the second received timestamp value less the copied free running clock value and less the difference between the known reference point in time relative to the time the second data unit was received and the location in the received second data unit of the extracted synchronization information.

12. A clock synchronization method in a wireless node of a wireless network, the wireless node including a receiver, the method comprising:
generating an offset to the value of a free-running clock such that a local time reference determined as the sum of the value of the free-running clock and the generated offset is approximately synchronized to a previous timestamp in a previously received data unit containing a previous timestamp, the generating forming a determined offset; and
receiving a new data unit containing a new timestamp at the receiver;
extracting the new timestamp from the received new data unit containing the new timestamp;
updating the determined offset after the receipt of the new data unit using the extracted new timestamp and the value of the free-running clock at a known reference point in time relative to the time the new data unit was received.

13. A method as recited in claim 12, wherein the value of the free-running clock at the known reference point in time is obtained by taking a copy of the free-running clock at the known reference point in time.

14. A method as recited in claim 12, wherein the node is a station in an ad hoc wireless network.

15. A method as recited in claim 14, wherein the updating modifies the previously determined offset only if the local synchronized time lags the value the local time reference would have using the received new timestamp.

16. A method as recited in claim 15, wherein the local synchronized time is determined as the sum of the value of the free-running clock at the known reference point, the generated offset, and the difference in time between the known reference point and the point in time where the received timestamp is located.

17. A method as recited in claim 16, wherein the difference in time between the known reference point and the point in time where the received timestamp is located is a function of the data rate.

18. A method as recited in claim 15, wherein the updated offset is the received timestamp less the value of the free-running clock at the known reference point in time and less the difference in time between the known reference point and the point in time where the received timestamp is located.

19. A method as recited in claim 12, wherein the node is a station in an infrastructure wireless network containing an access point that periodically transmits data units containing timestamps.

20. A method as recited in claim 19, wherein the offset is re-calculated every time a data unit is received containing a timestamp transmitted from the access point of the station.

21. A method as recited in claim 20, wherein the local synchronized time is determined as the sum of the value of the free-running clock at the known time reference, the previously determined offset, and the difference in time between the known reference point and the point in time where the received timestamp is located.

22. A method as recited in claim 21, wherein the difference in time between the known reference point and the point in time where the received timestamp is located is a function of the data rate.

23. A method as recited in claim 20, wherein the offset is calculated as the difference of the received timestamp and the sum of the value of the free-running clock at the known reference point in time and the difference in time between the known reference point and the point in time where the received timestamp is located.

24. A method as recited in claim 12, wherein the accuracy of arithmetic used in the updating of the offset is at least 64-bits.

25. A method as recited in claim 12, wherein the data unit containing the timestamp is a beacon conforming to the IEEE 802.11 standard.

26. A method as recited in claim 12, wherein the data unit containing the timestamp is a probe response conforming to the IEEE 802.11 standard.

27. A method as recited in claim 12, wherein the node is a station in a wireless network, the node including a transmitter, the method farther comprising:

determining a second offset to the value of the local free-running clock at a second known reference point in time relative to the time a data unit for transmission is to be transmitted;

copying the value of the local free-running clock at the second known reference point to form a second local timestamp;

forming a second timestamp using the second offset and the second local time stamp inserting the second timestamp into a second data unit; and transmitting the second data unit at the time the data unit for transmission is to be transmitted.

28. A method of transmitting a data unit containing synchronization information from a wireless node of a wireless network, the wireless node including a transmitter, the method comprising:

determining an offset to the value of a local free-running clock at a known reference point in time relative to the time a data unit for transmission is to be transmitted;

generating a timestamp corresponding to the sum of the value of the local free-running clock at the known reference point and the determined offset;

inserting the generated timestamp into the data unit for transmission at a known point in the data unit; and transmitting the data unit for transmission containing the inserted time stamp, wherein the wireless node includes a receiver to receive at least one data unit containing synchronization information, wherein the synchronization information in a received data unit is used to calculate an adjustment factor to the value of the free-running clock, and wherein determining the offset includes forming the sum of a previously determined adjustment factor and the difference between the known reference point in time relative to the time the data unit is transmitted and the location in the data unit of the inserted timestamp.

29. A method as recited in claim 28, wherein the difference is a function of the data rate.

30. An apparatus to synchronize a clock in a wireless receiver, the apparatus comprising:

a free-running clock;

means for receiving a first data unit containing synchronization information;

means for copying the free-running clock contents at a known reference point in time relative to the time the data unit was received to generate a local timestamp, the copying means coupled to the free-running clock;

means for extracting the synchronization information from the received first data unit to form an extracted timestamp, the extracting means coupled to the receiving means;

means for calculating an offset to the free-running clock using the extracted timestamp and the local timestamp, the calculating means coupled to the extracting means and the copying means, such that the sum of the calculated offset and the value of the free-running clock provides a local clock value that is approximately synchronized in time.

31. An apparatus as recited in claim 30, wherein the calculating means is further for updating the offset after the receipt of a new data unit that includes new synchronization information, wherein the copying means is for copying the free-running clock contents at a new known reference point in time relative to the time the new data unit was received to generate a new local timestamp, wherein the extracting means is for extracting a new timestamp from the new data unit, and wherein the updating uses the extracted new timestamp and the new local timestamp.

32. An apparatus as recited in claim 31, wherein the receiver is part of a node of a wireless data network, and wherein the data unit containing synchronization information is a beacon.

33. An apparatus as recited in claim 32, wherein the node is a station in an infrastructure wireless network containing an access point that periodically transmits data units containing synchronization information.

34. An apparatus as recited in claim 33, wherein the offset is re-calculated every time a data unit is received containing a timestamp transmitted from the access point of the station.

35. An apparatus as recited in claim 34, wherein the local clock value is determined as the sum of the local timestamp, the previously determined offset, and the difference in time between the known reference point and the point in time where the received timestamp is located.

36. An apparatus as recited in claim 35, wherein the difference in time between the known reference point and the point in time where the received synchronization information is located is a function of the data rate.

37. An apparatus as recited in claim 34, wherein the offset is calculated to be the difference between the received timestamp and the sum of the local timestamp and the difference in time between the known reference point and the point in time where the synchronization information is located.

38. An apparatus as recited in claim 32, wherein the received first and new data units containing the synchronization information are beacons conforming to the IEEE 802.11 standard.

39. An apparatus as recited in claim 31, wherein the apparatus is part of a station of an ad hoc wireless network.

40. An apparatus as recited in claim 39, wherein the updating modifies the previously determined offset only if the local clock value lags the value the local time would have using the received new timestamp.

41. An apparatus as recited in claim 40, wherein the local clock value is determined as the sum of the local timestamp, the calculated offset, and the difference in time between the known reference point and the point in time where the received synchronization information is located.

42. An apparatus as recited in claim 41, wherein the difference in time between the known reference point and the point in time where the received timestamp is located is a function of the data rate.

43. An apparatus as recited in claim 40, wherein the updated offset is the received timestamp less the local timestamp less the difference in time between the known reference point in time and the point in time where the received synchronization information is located.

44. An apparatus as recited in claim 31, wherein the accuracy of arithmetic used in the updating of the offset is at least 64-bits.

45. An apparatus as recited in claim 31, wherein the data unit containing the timestamp is a probe response conforming to the IEEE 802.11 standard.

46. An apparatus as recited in claim 30, wherein the apparatus is part of a node in a wireless network, and wherein the means for copying also copies the value of the local free-running clock at a second known reference point in time relative to the time a data unit for transmission is to be transmitted to form a second local timestamp, the apparatus further comprising:

means coupled to the free-running clock for determining a second offset to the value of the local free-running clock at the second known reference point;

means for forming a second timestamp using the second offset and the second local timestamp, the timestamp forming means coupled to the means for determining the second offset;

means coupled to the timestamp forming means for inserting the second timestamp into a second data unit; and means coupled to the inserting means for transmitting the second data unit at the time the data unit for transmission is to be transmitted.

47. An apparatus for transmitting a data unit containing synchronization information from a wireless node of a wireless network, the wireless node including a transmitter, the apparatus comprising:

a local free-running clock;

means for copying the value of the free-running clock at a known reference point in time relative to the time a data unit for transmission is to be transmitted, the means for copying coupled to the local free-running clock, the copying providing a local timestamp;

means for generating a timestamp, the generating means including means for determining an offset to the local timestamp, the timestamp corresponding to the sum of the local timestamp and the determined offset, the generating means coupled to the copying means;

means for inserting the generated timestamp into the data unit for transmission at a known point in the data unit, the inserting means coupled to the timestamp generating means; and means for transmitting the data unit for transmission containing the inserted timestamp, the transmitting means coupled to the timestamp insertion means.

48. An apparatus as recited in claim 47, wherein the wireless node is in an ad hoc network, and wherein the offset is a fixed value.

49. An apparatus as recited in claim 47, further comprising:

means for receiving at least one data unit containing synchronization information;

means for extracting the synchronization information from the received data unit; and means for forming an adjustment factor to the value of the free-running clock, wherein determining the adjustment factor includes forming the sum of a previously determined adjustment factor and the difference between the known reference point in time relative to the time the data unit is to be transmitted and the location in the data unit of the inserted timestamp.

50. An apparatus as recited in claim 49, wherein the difference is a function of the data rate.

51. An apparatus as recited in claim 47, wherein the accuracy of arithmetic used in the determining of the offset is at least 64-bits.

* * * * *

UNITED STATES PATENT AND TRADEMARK OFFICE
CERTIFICATE OF CORRECTION

| | | |
|---|---|---|
| PATENT NO. | : 7,151,945 B2 | |
| APPLICATION NO. | : 10/112220 | |
| DATED | : December 19, 2006 | |
| INVENTOR(S) | : Myles et al. | |

It is certified that error appears in the above-identified patent and that said Letters Patent is hereby corrected as shown below:

In column 11, line 15, kindly change "(DIEFS)," to --(DIFS),--.

In column 17, line 3, kindly change "farther comprising:" to --further comprising:--.

Signed and Sealed this

Twentieth Day of February, 2007

JON W. DUDAS
*Director of the United States Patent and Trademark Office*